United States Patent
Yamamoto et al.

(10) Patent No.: US 10,139,290 B2
(45) Date of Patent: Nov. 27, 2018

(54) OPTICAL TEMPERATURE SENSOR AND METHOD FOR MANUFACTURING OPTICAL TEMPERATURE SENSOR

(71) Applicant: Tokyo Electron Limited, Tokyo (JP)

(72) Inventors: Takari Yamamoto, Miyagi (JP); Kenichiro Yamada, Miyagi (JP); Yoshiki Yamakawa, Hyogo (JP); Yuji Mizuma, Hyogo (JP); Hirokazu Taniguchi, Hyogo (JP); Masatoshi Tabira, Hyogo (JP)

(73) Assignee: Tokyo Electron Limited, Tokyo (JP)

( * ) Notice: Subject to any disclaimer, the term of this patent is extended or adjusted under 35 U.S.C. 154(b) by 189 days.

(21) Appl. No.: 15/116,569

(22) PCT Filed: Mar. 2, 2015

(86) PCT No.: PCT/JP2015/056058
§ 371 (c)(1),
(2) Date: Aug. 4, 2016

(87) PCT Pub. No.: WO2015/133427
PCT Pub. Date: Sep. 11, 2015

(65) Prior Publication Data
US 2016/0363486 A1    Dec. 15, 2016

(30) Foreign Application Priority Data

Mar. 4, 2014  (JP) ................ 2014-042137

(51) Int. Cl.
*G01K 11/12* (2006.01)
*G01K 1/14* (2006.01)
*G01K 1/08* (2006.01)

(52) U.S. Cl.
CPC .............. *G01K 11/125* (2013.01); *G01K 1/08* (2013.01); *G01K 1/14* (2013.01)

(58) Field of Classification Search
CPC ........... G01K 11/125; G01K 1/08; G01K 1/14
See application file for complete search history.

(56) References Cited

U.S. PATENT DOCUMENTS 4,703,174 A * 10/1987 Anderson .............. G01D 5/268
250/227.21
5,446,279 A * 8/1995 Hsu ....................... G01L 9/0077
250/227.21

(Continued)

FOREIGN PATENT DOCUMENTS

JP    S61-213738    9/1986
JP    S61-232684    10/1986

(Continued)

*Primary Examiner* — Lisa Caputo
*Assistant Examiner* — Philip Cotey
(74) *Attorney, Agent, or Firm* — IPUSA, PLLC (57) ABSTRACT

Provided is an optical temperature sensor including a temperature sensing element having light transmission characteristics that vary with temperature, a hollow holding member that holds the temperature sensing element, and an optical fiber that is arranged inside the holding member, the optical fiber including a tip face that is disposed to face the temperature sensing element at a position separated from the temperature sensing element by a predetermined distance. The temperature sensing element allows light emitted from the tip face of the optical fiber to be incident thereon, allows the incident light to be transmitted therethrough, and allows reflected light of the transmitted light that has been reflected by a measuring object to be transmitted therethrough.

7 Claims, 9 Drawing Sheets (56) References Cited

U.S. PATENT DOCUMENTS

| | | | |
|---|---|---|---|
| 7,056,035 B2* | 6/2006 | Iida | G02B 6/12026 |
| | | | 385/92 |
| 2003/0206573 A1* | 11/2003 | Gotthold | G01J 5/0003 |
| | | | 374/132 |
| 2004/0258130 A1* | 12/2004 | Gotthold | G01J 5/0003 |
| | | | 374/208 |
| 2006/0140248 A1* | 6/2006 | Gotthold | G01J 5/0003 |
| | | | 374/161 |
| 2008/0225926 A1* | 9/2008 | Gotthold | G01J 5/0003 |
| | | | 374/131 |
| 2010/0040112 A1* | 2/2010 | Huck | G01K 1/08 |
| | | | 374/183 |
| 2011/0267598 A1* | 11/2011 | Hjort | G01K 1/14 |
| | | | 356/32 |
| 2012/0039358 A1* | 2/2012 | Bosselmann | E21B 47/065 |
| | | | 374/161 |
| 2012/0225170 A1* | 9/2012 | Sonnendorfer | F24C 7/08 |
| | | | 426/231 |
| 2012/0251759 A1* | 10/2012 | Yamawaku | G01K 5/48 |
| | | | 428/58 |
| 2015/0168231 A1* | 6/2015 | Koshimizu | G01K 11/125 |
| | | | 156/345.27 |

FOREIGN PATENT DOCUMENTS

| | | |
|---|---|---|
| JP | S61-233331 | 10/1986 |
| JP | S62-085832 | 4/1987 |
| JP | H01-242931 | 9/1989 |

* cited by examiner

OPTICAL TEMPERATURE SENSOR AND METHOD FOR MANUFACTURING OPTICAL TEMPERATURE SENSOR

TECHNICAL FIELD

The present invention relates to an optical temperature sensor and a method for manufacturing an optical temperature sensor.

BACKGROUND ART

Optical temperature sensors are known that use a temperature sensing element made of a semiconductor having an energy gap that varies in response to temperature changes (see, e.g., Patent Documents 1-5). Such optical temperature sensors are configured to transmit signal light emitted from a first light emitting element and reference light emitted from a second light emitting element through the temperature sensing element, and detect an external temperature based on the light intensities of the signal light and the reference light that have been transmitted through the temperature sensing element.

PRIOR ART DOCUMENTS

Patent Documents

Patent Document 1: Japanese Laid-Open Patent Publication No. 62-85832
Patent Document 2: Japanese Laid-Open Patent Publication No. 61-213738
Patent Document 3: Japanese Laid-Open Patent Publication No. 61-233331
Patent Document 4: Japanese Laid-Open Patent Publication No. 1-242931
Patent Document 5: Japanese Laid-Open Patent Publication No. 61-232684

SUMMARY OF THE INVENTION

Problem to be Solved by the Invention

However, values detected by the optical temperature sensors as described above may fluctuate due to the structure of the temperature sensors.

Also, in temperature measuring devices for measuring the temperature of a measuring object based on values detected by optical temperature sensors, measurement accuracy, responsiveness, and stability may be degraded depending on the environmental temperature and individual unit differences of components and the like.

In view of the above problems, it is an object of the present invention to provide an optical temperature sensor and a temperature measuring device that are capable of achieving favorable responsiveness and stability and improved temperature measurement accuracy.

Means for Solving the Problem

According to one aspect of the present invention, an optical temperature sensor is provided that includes a temperature sensing element having light transmission characteristics that vary with temperature, a hollow holding member that holds the temperature sensing element, and an optical fiber that is arranged inside the holding member, the optical fiber including a tip face that is disposed to face the temperature sensing element at a position separated from the temperature sensing element by a predetermined distance. The temperature sensing element allows light emitted from the tip face of the optical fiber to be incident thereon, allows the incident light to be transmitted therethrough, and allows reflected light of the transmitted light that has been reflected by a measuring object to be transmitted therethrough.

According to another aspect of the present invention, a method for manufacturing the above optical temperature sensor is provided, the method including a step of holding the temperature sensing element in the holding member, a step of rotating the holding member in a state where the tip face of the optical fiber is separated from the temperature sensitive element and optimizing a facing position of the tip face of the optical fiber with respect to the temperature sensing element, and a step of arranging the optical fiber at the optimized facing position, which is separated from the temperature sensing element by the predetermined distance.

Advantageous Effect of the Invention

According to an aspect of the present invention, an optical temperature sensor and a temperature measuring device may be provided that are capable of achieving favorable responsiveness and stability and improved temperature measurement accuracy.

EMBODIMENTS FOR IMPLEMENTING THE INVENTION

In the following, embodiments of the present invention are described with reference to the accompanying drawings. Note that in the present descriptions and the drawings, features and elements that are substantially identical are given the same reference numerals and overlapping descriptions may be omitted.

[Optical Temperature Sensor]

Figure 1:
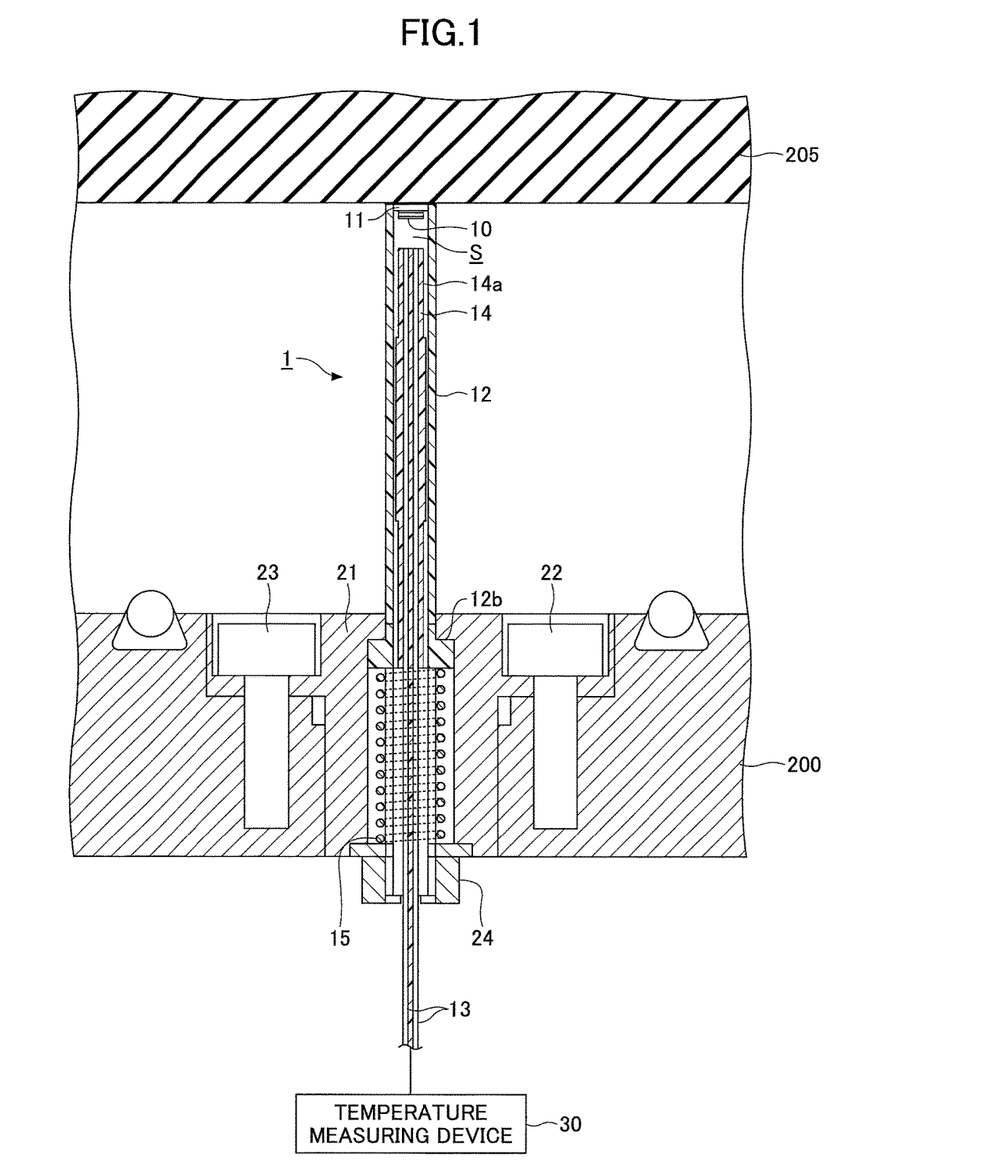
FIG. 1 is an overall configuration diagram of an optical temperature sensor according to an embodiment of the present invention.

First, an optical temperature sensor 1 according to an embodiment of the present invention will be described with reference to FIG. 1. FIG. 1 is an overall configuration diagram of an optical temperature sensor 1 according to an embodiment of the present invention. The optical temperature sensor 1 is a temperature sensor that uses optical fiber and a compound semiconductor chip (thermosensitive element) that changes an optical absorption wavelength as a function of temperature. That is, the optical temperature sensor 1 is a semiconductor absorption wavelength-based temperature sensor that detects the temperature using a thermosensitive element that changes absorption wavelengths (absorption properties) for transmitted light depending on the temperature.

The optical temperature sensor 1 includes a thermosensitive element 10, a heat transfer aluminum plate 11, a holding cylinder 12, an optical fiber 13, a fixing member 14, and a spring 15. The thermosensitive element 10 is made of the compound semiconductor gallium arsenide (GaAs). An aluminum reflection film is formed on an upper face of the thermosensitive element 10, and an antireflection film is formed on a lower face of the thermosensitive element 10. The thermosensitive element 10 is an example of a temperature sensing element that has light transmission characteristics that vary with temperature. Note that the temperature sensing element is not limited to the compound semiconductor gallium arsenide (GaAs) as long as it is made of a substance that has light transmission characteristics that vary depending on the temperature.

The heat transfer aluminum plate 11 that has high thermal conductivity is fixed to the upper face of the thermosensitive element 10 with an adhesive. With respect to the structure of the tip portion of the optical temperature sensor 1, the holding cylinder 12 has an opening at its tip, and the heat transfer aluminum plate 11 having the thermosensitive element 10 adhered thereto is fit into the opening of the holding cylinder 12. In this way, the opening of the holding cylinder 12 may be closed, and the thermosensitive element 10 is arranged inside the holding cylinder 12 and fixed at its tip portion. The holding cylinder 12 is cylindrically shaped and has the optical fiber 13 arranged therein. The holding cylinder 12 is an example of a holding member for holding the temperature sensing element. Note that the holding member does not necessarily have to be cylindrically shaped as long as it is a hollow member that can hold the optical fiber 13 therein.

The optical fiber 13 has a two-core structure. The fixing member 14 surrounds the optical fiber 13 and is fixed to the holding cylinder 12 with adhesive. In this way, the optical fiber 13 may be arranged to extend vertically such that its tip face may be positioned at a tip portion of the optical temperature sensor 1.

In the present embodiment, an electrostatic chuck (ESC) is illustrated as an example of a temperature measuring object 205. The temperature of the temperature measuring object 205 is transmitted to the thermosensitive element 10 through the heat transfer aluminum plate 11. Note that when heat is exchanged between the thermosensitive element 10 and the holding cylinder 12, the optical fiber 13, or the fixing member 14, an error may occur in the temperature (detected value) of the temperature measuring object 205 detected by the thermosensitive element 10 and the accuracy of the temperature sensor may be degraded.

Accordingly, in the optical temperature sensor 1 according to the present embodiment, the thermosensitive element 10 is arranged to not be in contact with the tip faces of and the optical fiber 13 and the fixing member 14. That is, the tip face of the optical fiber 13 is arranged to face the thermosensitive element 10 at a position separated from the thermosensitive element 10 by a predetermined distance. Thus, a hollow portion S is formed between the faces of the optical fiber 13 and the thermosensitive element 10. Note that the distance between the thermosensitive element 10 and the tip face of the optical fiber 13 may be optimized with respect to the design value (e.g., 2.55 mm to 2.65 mm) by rotating the holding cylinder 12 to make fine adjustments to the facing position of the tip face of the optical fiber 13 with respect to the thermosensitive element 10. The optimization of the above distance during a manufacturing process is described below in connection with a method for manufacturing the optical temperature sensor 1 described below.

Also, the optical temperature sensor 1 according to the present embodiment is designed such that the temperature of the thermosensitive element 10 may not be easily transmitted to the holding cylinder 12 and the optical fiber 13. In this way, temperature measurement accuracy may be improved and responsiveness to a temperature change of a measuring object may be improved.

Specifically, the holding cylinder 12, which is adhered to the heat transfer aluminum plate 11, is made of a material having low thermal conductivity, excellent mechanical strength, and high thermal resistance. The fixing member 14 is similarly made of a material having low thermal conductivity, excellent mechanical strength, and high thermal resistance. For example, the holding cylinder 12 and the fixing member 14 may be made of resin bodies with low thermal conductivity, such as PPS (polyphenylene sulfide).

Also, the area of contact between the holding cylinder 12 and the heat transfer aluminum plate 11 is arranged to be as small as possible in order to suppress the heat transfer. Further, the holding cylinder 12 and the fixing member 14 are arranged to be as thin as possible in order to reduce heat conduction. In particular, a tip portion of the fixing member 14 that is positioned near the thermosensitive element 10 is arranged to have a smaller diameter (thickness) than the diameter (thickness) of a lower portion. That is, a drop shoulder portion 14a is formed at the tip portion of the fixing member 14 to reduce the thickness of the fixing member 14 near the thermosensitive element 10. Thus, a space is created between the side portions of the fixing member 14 and the holding cylinder 12 at the drop shoulder portion 14a, and the area of contact between the holding cylinder 12 and the fixing member 14 may be reduced. With such a configuration, the amount of heat transferred from the thermosensitive element 10 to the holding cylinder 12 and the fixing member 14 may be reduced and responsiveness to a temperature change of a measuring object may be improved.

Also, a protruding portion 12b that protrudes outward and has a larger diameter than an upper portion of the holding cylinder 12 is formed at a bottom portion of the holding cylinder 12. At the protruding portion 12b, a space is formed between the holding cylinder 12 and the optical fiber 13 accommodated within the holding cylinder 12, and a spring 15 may be arranged in such a space, for example. The holding cylinder 12 is fit into an aluminum flange 21, and the holding cylinder 12 may be fixed in place by fixing the flange 21 to a mounting table 200 using screws 22 and 23, for example. An aluminum bushing 24 is arranged below the flange 21. The spring 15 may be fixed to the upper surface of the bushing 24 by fixing the flange 21 with screws 22 and 23.

The tip portion of the optical temperature sensor 1 is configured such that the temperature of the measuring object 205 may be transferred to the thermosensitive element 10 through the heat transfer aluminum plate 11. In the present embodiment, the holding cylinder 12 is pushed upward by the expansion/contraction of the spring 15, and the tip portion of the optical temperature sensor 1 is pushed against the lower surface of the temperature measuring object 205. By pushing the heat transfer aluminum plate 11 against the lower surface of the temperature measuring object 205, stable heat transfer between the temperature measuring object 205 and the heat transfer aluminum plate 11 may be performed, and temperature detection by the thermosensitive element 10 may be stably performed. Note that the reaction force of the spring 15 may be set to a minimum force required for securing an adequate area of contact between the heat transfer aluminum plate 11 and the measuring object 205 for stably measuring the temperature of the measuring object 205. The reaction force of the spring 15 is set to such a minimum force such that excessive force would not be applied to the temperature measuring object 205.

LED light output from a temperature measuring device 30 passes through the optical fiber 13 and is transmitted through the thermosensitive element 10 to be reflected by the lower face of the temperature measuring object 205. Then, the reflected light is re-transmitted through the thermosensitive element 10 and is passed through the optical fiber 13 to be received by the temperature measuring device 30.

[Method for Manufacturing Optical Temperature Sensor]

Figure 2:
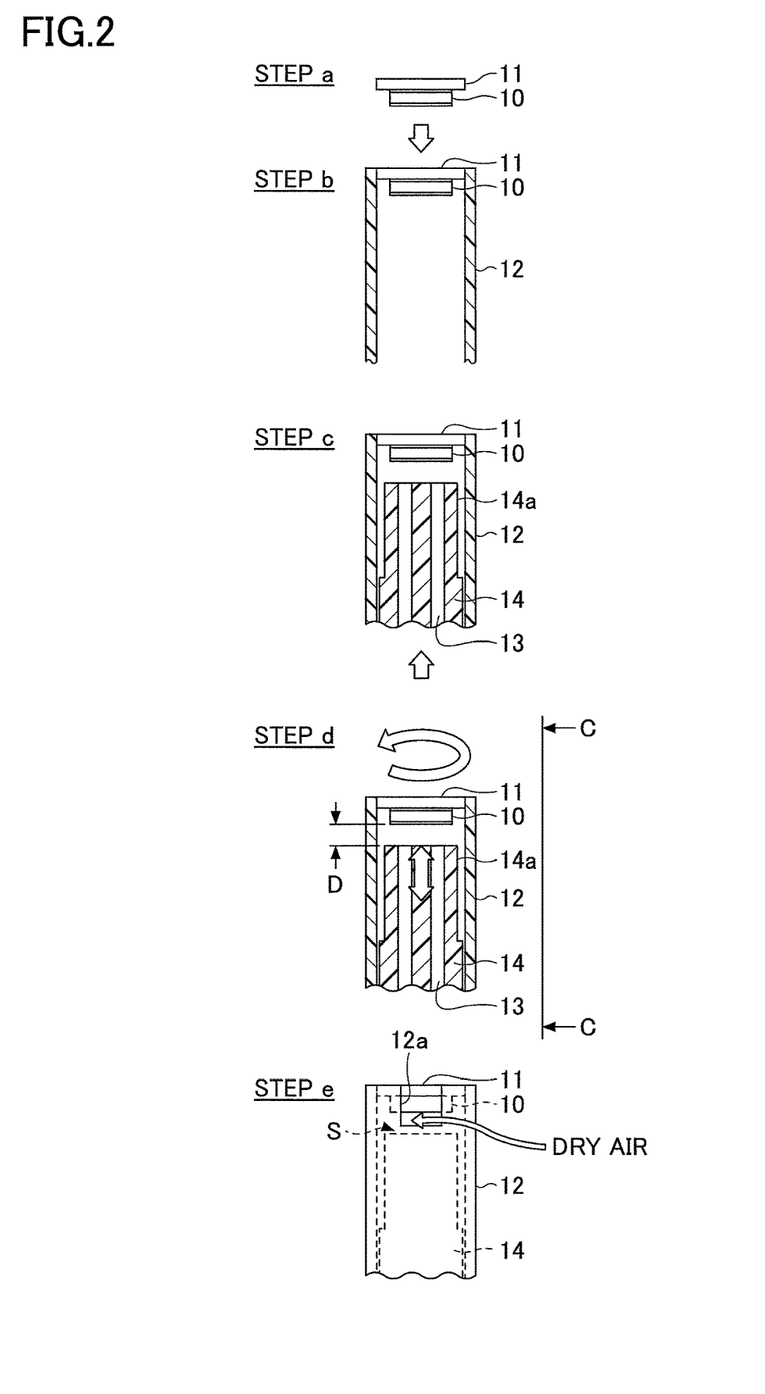
FIG. 2 is a diagram showing a method for manufacturing an optical temperature sensor according an embodiment of the present invention.

In the following, a method for manufacturing the optical temperature sensor 1 according to the present embodiment will be described with reference to FIG. 2. FIG. 2 illustrates a method for manufacturing the optical temperature sensor 1 according to one embodiment. Note that before starting the manufacture of the optical temperature sensor 1, a cutout portion 12*a* as shown at the bottom of FIG. 2 is formed at a side face of the tip portion of the holding cylinder 12.

(Step a)

First, the thermosensitive element 10 made of gallium arsenide (GaAs) is adhered to the lower face of the heat transfer aluminum plate 11.

(Step b)

The heat transfer aluminum plate 11, in such a state, is adhered to the holding cylinder 12 to close the opening at the tip portion of the holding cylinder 12.

(Step c)

Then, the optical fiber 13 that is integrated with the fixing member 14 is inserted into the holding cylinder 12.

(Step d)

Then, the holding cylinder 12 is rotated while adjusting the distance D between the tip face of the optical fiber 13 and the thermosensitive element 10. At this time, light is output from an LED that is installed in the temperature measuring device 30. The light is passed through the optical fiber 13, emitted from the tip of the optical fiber 13, and transmitted through the thermosensitive element 10. The light reflected by the measuring object 205 is re-transmitted through the thermosensitive element 10, is passed through the optical fiber 13, and is received by the temperature measuring device 30. Based on the light quantity (measured value) of the received reflected light, a suitable position in a rotating direction of the thermosensitive element 10 at which the optical temperature sensors 1 would be less likely to exhibit individual unit differences is searched, and a suitable distance D between the tip face of the optical fiber 13 and the thermosensitive element 10 is searched. While maintaining an optimized position (distance D) between the thermosensitive element 10 and the tip face of the optical fiber 13 obtained from the above search, the side wall of the fixing member 14 is adhered to the holding cylinder 12.

In the above manufacturing method, the hollow portion S with the distance D is created between the tip face of the optical fiber 13 and the thermosensitive element 10. Note that a design reference value is provided for the distance D between the tip face of the optical fiber 13 and the thermosensitive element 10. However, in the method for manufacturing the optical temperature sensor 1 according to the present embodiment, the holding cylinder 12 is rotated in a state where the tip face of the optical fiber 13 is separated from the thermosensitive element 10, and the position of the tip face of the optical fiber 13 is finely adjusted in the vertical direction. In this way, the position in the rotating direction of the thermosensitive element 10 with respect to a central axis of the holding cylinder 12 may be adjusted, and at the same time, the distance D between the tip face of the optical fiber 13 and the thermosensitive element 10 may be finely adjusted with respect to the design reference value. In this way, the facing position of the tip face of the optical fiber 13 with respect to the thermosensitive element 10 may be optimized.

In the following, advantages of optimizing the position in the rotating direction of the thermosensitive element 10 and the distance D between the tip face of the optical fiber 13 and the thermosensitive element 10 in the optical temperature sensor 1 are described. The optical temperature sensor 1 detects a temperature using the thermosensitive element 10 that changes optical absorption wavelengths as a function of temperature. Upon manufacturing the optical temperature sensor 1, in the step of adhering the thermosensitive element 10 to the heat transfer aluminum plate 11 (step a), the position and angle at which the thermosensitive element 10 is bonded may not necessarily be constant. Thus, by finely adjusting the distance D between the tip face of the optical fiber 13 and the thermosensitive element 10 while rotating the holding cylinder 12, the light quantity (measured value) of reflected light that has passed through the thermosensitive element 10 may be adjusted to be a designated light quantity. In this way, individual unit differences may be reduced in the tip portion structure of the optical temperature sensor 1 including the thermosensitive element 10. Thus, in the method for manufacturing the optical temperature sensor 1 according to the present embodiment, individual unit differences of the optical temperature sensor 1 may be reduced, and the accuracy of temperatures measured by the optical temperature sensor 1 may be improved.

(Condensation Prevention)

(Step e)

The illustration of step e in FIG. 2 is a side view of the tip portion of the optical temperature sensor 1 as viewed from plane C-C of the illustration of step d. When condensation occurs at the thermosensitive element 10, it becomes difficult to make accurate temperature measurements. Accordingly, measures need to be implemented to prevent condensation in the hollow portion S. In this respect, the optical temperature sensor 1 of the present embodiment has the cutout portion 12*a* formed on a side face of the tip portion of the holding cylinder 12. The cutout portion 12*a* communicates with the hollow portion S. Thus, the space in which the thermosensitive element 10 is arranged is not sealed, and outside air can flow into the space. Also, dry air may be arranged to flow into the hollow portion S from the cutout portion 12*a* and the dry air may be circulated around the position where the thermosensitive element 10 is arranged. In this way, water may be prevented from being introduced into the hollow portion S to cause condensation at the tip portion of the optical temperature sensor 1. Thus, the temperature of a measuring object may be stably measured.

In the foregoing, the configuration and the method for manufacturing the optical temperature sensor 1 according to the present embodiment have been described. The optical temperature sensor 1 according to the present embodiment transmits light emitted from the tip face of the optical fiber 13 through the thermosensitive element 10. The transmitted light is reflected by a surface of the heat transfer aluminum plate 11 that is in contact with the measuring object. The reflected light is re-transmitted through the thermosensitive element 10 and enters the optical fiber 13 by being incident on the tip face of the optical fiber 13. The reflected light that has entered the tip face of the optical fiber 13 passes through the optical fiber 13 to be output to the temperature measuring device 30. The temperature measuring device 30 measures the wavelength of the light absorbed by the thermosensitive element 10 based on the input reflected light, and converts the measured wavelength of the absorbed light into a corresponding temperature. In this way, the temperature of the measuring object 205 is measured.

In the following, one embodiment of the temperature measuring device 30 that measures the temperature of a measuring object using the optical temperature sensor 1 having the above-described configuration is described.

[Temperature Measuring Device]

Figure 3:
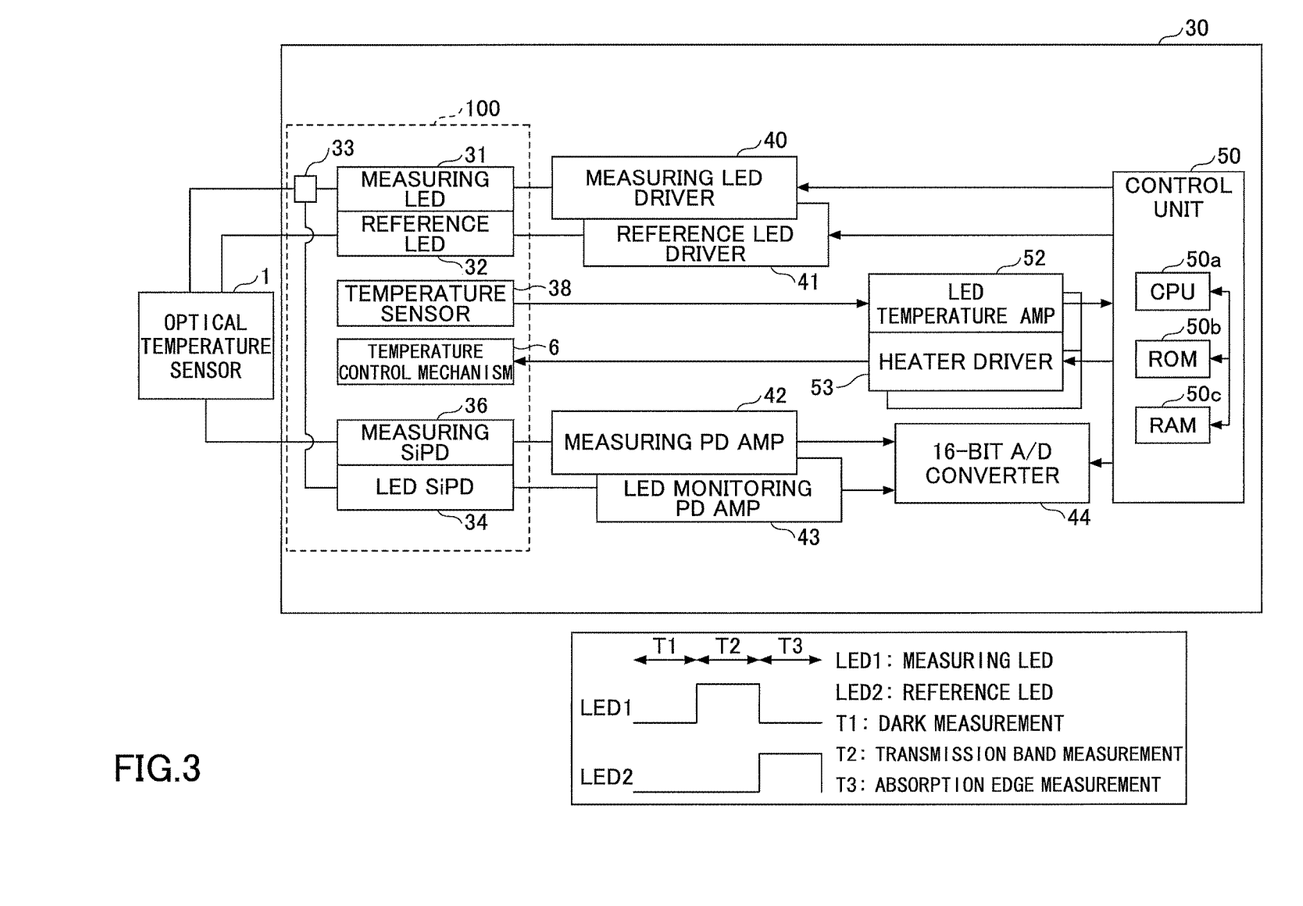
FIG. 3 is a block diagram of a temperature measuring device according to an embodiment of the present invention.

FIG. 3 is a block diagram of the temperature measuring device 30 according to an embodiment of the present invention. The temperature measuring device 30 according to the present embodiment includes a light projecting/receiving module 100, a measuring LED driver 40, a reference LED driver 41, a measuring PD (photodiode) amplifier (amp) 42, an LED monitoring PD amplifier (amp) 43, a 16-bit A/D converter 44, a control unit 50, an LED temperature amplifier (amp) 52 and a heater driver 53.

(Light Projecting/Receiving Module)

Figure 4:
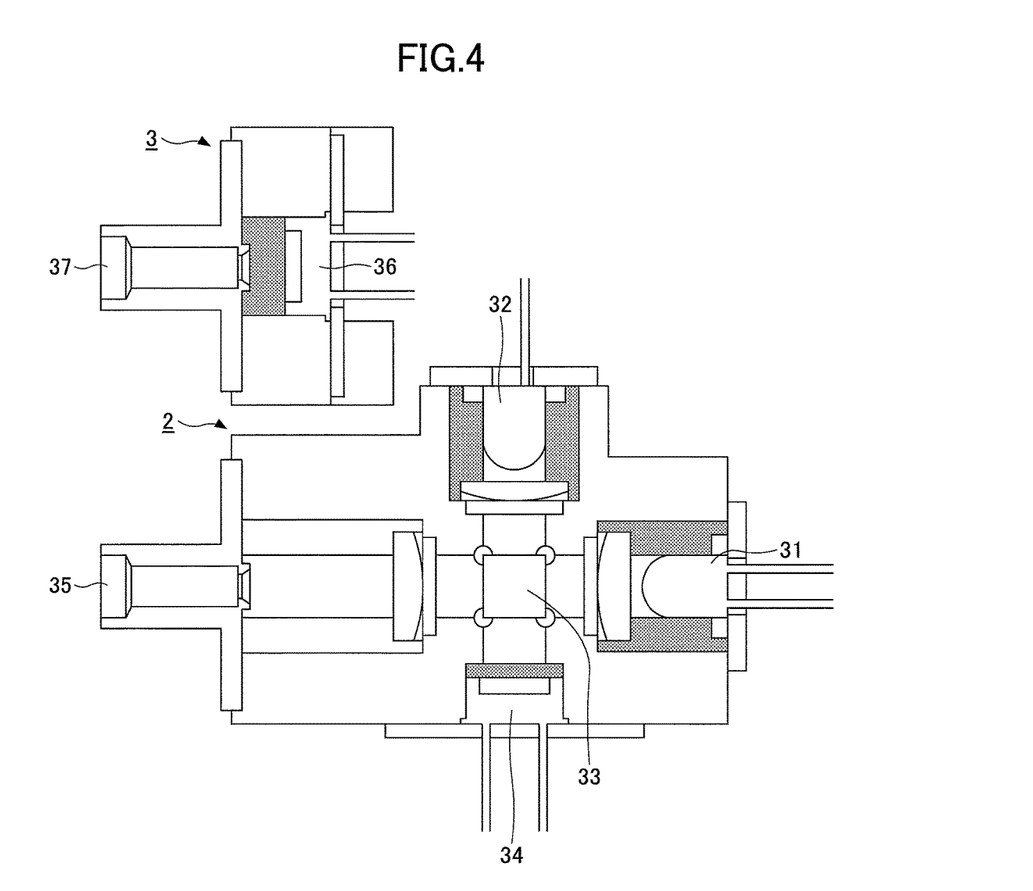
FIG. 4 is a diagram showing a light projecting/receiving module according an embodiment of the present invention.

The light projecting/receiving module 100 according to the present embodiment will be described below with reference to FIG. 4. The light projecting/receiving module 100 includes a light projecting unit (light projecting module) 2 for outputting measuring light and reference light, and a light receiving unit (light receiving module) 3 for receiving reflected light having wavelengths of light absorbed by the thermosensitive element 10 of the optical temperature sensor 1 (reflected light of the measuring light and reflected light of the reference light).

The light projecting unit 2 includes a measuring LED 31, a reference LED 32, a beam splitter 33, an LED SiPD (silicon photodiode) 34, and an optical connector 35. The light receiving unit 3 includes a measuring SiPD 36 and an optical connector 37.

The measuring LED 31 outputs measuring light having a first wavelength. The measuring LED 31 outputs light (measuring light) of a wavelength band that is transmitted through the thermosensitive element 10 at varying light quantities depending on the temperature of the thermosensitive element 10.

The reference LED 32 outputs reference light having a second wavelength. The reference LED 32 outputs light (reference light) of a wavelength band that is transmitted through the thermosensitive element 10 at a constant light quantity regardless of the temperature of the thermosensitive element 10; that is, the reference LED 32 outputs light (reference light) of a wavelength band that is transmitted through the thermosensitive element 10 at a light quantity that does not change as a function of the temperature of the thermosensitive element 10.

The beam splitter 33 transmits a part of the incident measuring light and reference light, and reflects a part of the measuring light and reference light. The light transmitted by the beam splitter 33 is transmitted to the optical temperature sensor 1 through the optical fiber 13 that is connected to the optical connector 35. The reflected light reflected by the beam splitter 33 is incident on the LED SiPD (silicon photodiode) 34. The LED SiPD 34 is a photodiode for light projection confirmation. The LED SiPD 34 outputs current values corresponding to the light quantity of the measuring light and the light quantity of the reference light.

The measuring SiPD 36 receives the reflected light from the optical temperature sensor 1 through the optical fiber 13 that is connected to the optical connector 37. The measuring SiPD 36 outputs a current value corresponding to the light quantity of the input reflected light.

(Configuration Other than Light Projecting/Receiving Module)

The configuration of the temperature measuring device 30 other than the light projecting/receiving module 100 is described below with reference to FIG. 3. The LED monitoring PD amplifier 43 amplifies and converts a current value output by the LED SiPD 34 into a corresponding voltage.

The 16-bit A/D converter 44 converts the voltage output by the LED monitoring PD amplifier 43 as an analog value into a digital value and inputs the resulting digital value as a monitor value to the control unit 50.

The control unit 50 controls an output value of an LED (the measuring LED 31 or the reference LED 32) to change according to a change in the monitor value of the LED. A pulse value of pulse width modulation (PWM) by the control unit 50 may be output as a control signal for changing the output value of the LED.

The control unit 50 includes a CPU (Central Processing Unit) 50a, a ROM (Read Only Memory) 50b, and a RAM (Random Access Memory) 50c. The CPU 50a performs temperature calculation and temperature management based on various types of data stored in a storage area such as the ROM 50b. Note that functions of the control unit 50 may be implemented by software operations, hardware operations, or a combination thereof.

The measuring LED driver 40 performs feedback control of a current to be supplied to the measuring LED 31 based on a pulse width of a control signal output by the control unit 50.

The reference LED driver 41 performs feedback control of a current to be supplied to the reference LED 32 based on a pulse width of a control signal output by the control unit 50.

In this way, based on the feedback control of the current values, measuring light with a certain light quantity and reference light with a certain light quantity are respectively output from the measuring LED 31 and the reference LED 32.

According to such a monitoring function, the light emitting intensities of the two types of LEDs used as light sources for emitting measuring light and reference light that are measured by the LED SiPD 34, and feedback control of the currents to be supplied to the LEDs is performed such that the light quantities of the measuring light and the reference light may always be constant. Thus, even when the actual light emitting intensities of the measuring LED 31 and the reference LED 32 themselves decrease over time due to aging, the light quantities of the measuring light and the reference light output by the measuring LED 31 and the reference LED 32 may be controlled to be constant by increasing the current values to be supplied according to such decrease based on feedback control of the current values. In this way, aging of the temperature measuring device 30 may be suppressed, highly accurate temperature measurement may be enabled, and the service life of the temperature measuring device 30 may be prolonged.

As described above, the measuring SiPD 36 receives the reflected light from the optical temperature sensor 1 through the optical fiber 13 that is connected to the optical connector 37. The measuring SiPD 36 outputs a current value corresponding to the light quantity of the input reflected light. The measuring PD amplifier 42 amplifies and converts the current value output by the measuring SiPD 36 into a corresponding voltage.

The 16-bit A/D converter 44 converts the voltage output as an analog value by the measuring PD amplifier 42 into a digital value and inputs the resulting digital value to the control unit 50 as a measurement value detected by the optical temperature sensor 1. The control unit 50 converts the measurement value into a corresponding temperature.

[Temperature Measuring Method]

Figure 5:
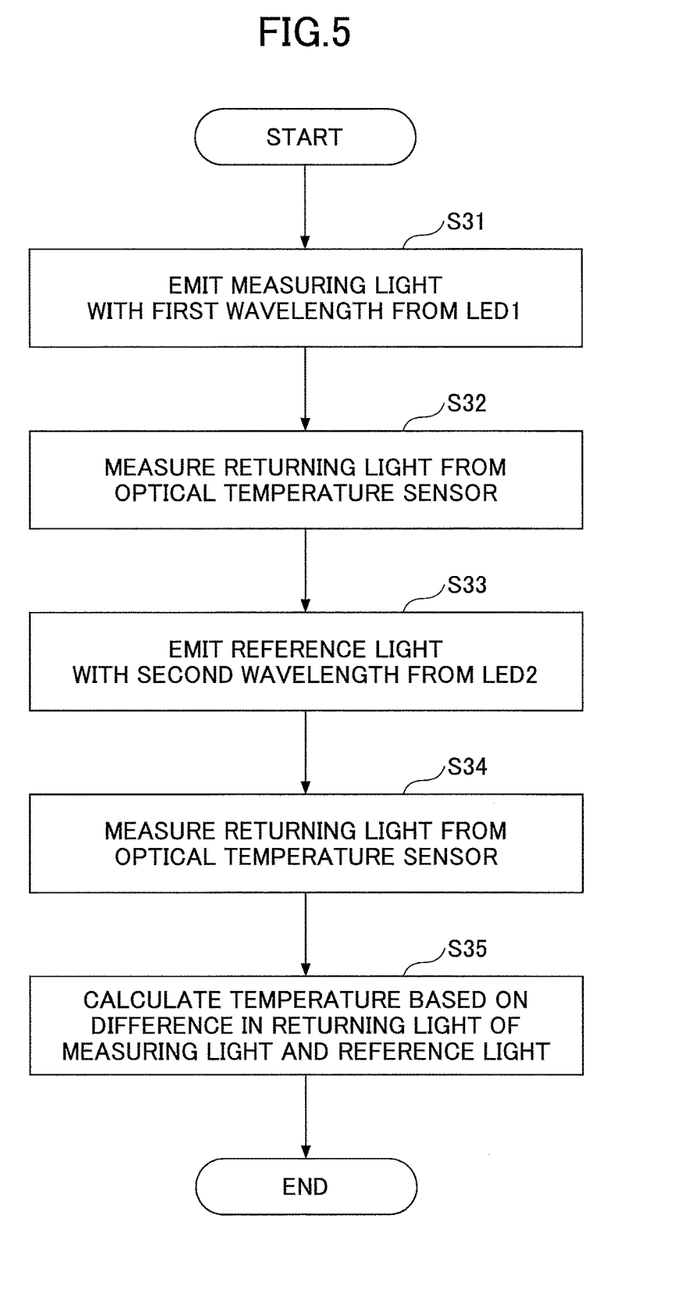
FIG. 5 is a flowchart showing a temperature measuring method according to an embodiment of the present invention.

In the following, a temperature measuring method using the temperature measuring device 30 according to an embodiment of the present invention is described with reference to FIG. 5. FIG. 5 is a flowchart illustrating a temperature measuring method according to an embodiment of the present invention. Note that before starting the temperature measuring method of FIG. 5, at time T1 illustrated in the bottom frame portion of FIG. 3, an output value (initial value) of the SiPD 36 is measured in a state where no light is output from the measuring LED 31 or the reference LED 32. Then, at time T2, reflected light (returning light) of light output by the measuring LED 31 (LED 1) is measured by the measuring SiPD 36. Then, at time T3, reflected light (returning light) of light output by the reference LED (LED 2) is measured by the measuring SiPD 36. Note that the above operations of times T1, T2, T3 are executed repeatedly. However, in the following, temperature control implemented upon executing the operations of times T1, T2, and T3 once is described.

Also, note that the output value measured by the measuring SiPD 36 at time T1 (initial value) is usually a value close to "0". However, in a case where the measured output value (initial value) is greater than or equal to a predetermined threshold value, the measurement value for the measuring light is corrected by subtracting the output value (initial value) from the measured value of the reflected light of light output by the measuring LED 31 at time T2. Similarly, in the case where the measured output value (initial value) is greater than or equal to the predetermined threshold value, the measurement value for the reference light is corrected by subtracting the output value (initial value) from the measured value of the reflected light of light output by the reference LED 32 at time T3. Note that in the temperature measuring method described below, it is assumed that such corrections are not performed, and a description of a case where such corrections are performed is omitted.

First, in step S31, the measuring LED 31 (LED 1) outputs the measuring light having the first wavelength. The measuring light passes through the optical fiber 13, and is emitted from the tip face of the optical fiber 13 to be transmitted through the thermosensitive element 10. The measuring light is light in a wavelength band (first wavelength) that is transmitted through the thermosensitive element 10 at a light quantity that changes in response to a change in the temperature of the thermosensitive element 10. The measuring light transmitted through the thermosensitive element 10 is reflected by the heat transfer aluminum plate 11 (face in contact with the measuring object). The reflected light of the measuring light is re-transmitted through the thermosensitive element 10 and enters the optical fiber 13 by being incident on the tip face of the optical fiber 13.

Then, in step S32, the measuring SiPD 36 receives the reflected light (returning light) from the optical temperature sensor 1 that has passed through the optical fiber 13. The measuring SiPD 36 outputs a current value I1 according to the light quantity of the received reflected light.

Then, in step S33, the reference LED 32 (LED 2) outputs the reference light having the second wavelength. The reference light passes through the optical fiber 13, and is emitted from the tip face of the optical fiber 13 to be transmitted through the thermosensitive element 10. The reference light is light in a wavelength band (second wavelength) that is transmitted through the thermosensitive element 10 at a constant light quantity that does not change even when the temperature of the thermosensitive element 10 changes. The reference light transmitted through the thermosensitive element is reflected by the heat transfer aluminum plate 11 (face in contact with the measuring object). The reflected light of the reference light is re-transmitted through the thermosensitive element 10 and enters the optical fiber 13 from the tip face of the optical fiber 13.

Then, in step S34, the measuring SiPD 36 receives the reflected light (returning light) from the optical temperature sensor 1 that has passed through the optical fiber 13. The measuring SiPD 36 outputs a current value I2 corresponding to the light quantity of the received reflected light.

Then, in step S35, the control unit 50 obtains a ratio of the current value I1 measured from the reflected light of the measuring light to the current value I2 measured from the reflected light of the reference light, calculates a corresponding temperature, and outputs the calculated temperature.

As described above, in the temperature measuring device 30 of the present embodiment, the temperature of the temperature measuring object 205 detected by the optical temperature sensor 1 is calculated based on the reflected light of the measuring light and the reflected light of the reference light.

Note that it was determined, by experiment, that in the temperature measuring device 30 of the present embodiment, the temperature can be measured within a period of about 8.3 milliseconds (ms). That is, according to an aspect of the present embodiment, the temperature measuring period can be substantially reduced as compared with conventional applications in which the temperature measuring period is typically about 40 milliseconds (ms).

[Temperature Control Unit]

In measuring the temperature based on the semiconductor absorption wavelength using the optical temperature sensor 1, the internal temperature of the light projecting/receiving module 100 may cause errors in measurement values. Oftentimes, such errors in the measurement values occur due to fluctuations in the measurement values resulting from fluctuations in the environmental temperature of the measuring LED 31 and the reference LED 32. That is, the center wavelength of an LED shifts with temperature. Thus, by controlling the environmental temperature of the LED to be constant, temperature measurement may be stably performed without being affected by the environmental temperature. Also, the center wavelength of an LED may slightly vary depending on each individual LED. Thus, by controlling the environmental temperature of the LED in order to absorb the individual unit differences in the LEDs, temperature measurement may be more stably performed, and individual unit differences in the temperature sensor may be reduced. Accordingly, in the present embodiment, temperature control mechanisms are provided for separately controlling the temperature of the measuring LED 31 and temperature of the reference LED 32. In the following, a temperature control unit including a temperature control mechanism for separately controlling the temperature of the measuring LED 31 and the temperature of the reference LED 32 will be described with reference to FIGS. 3 and 6.

First, referring to FIG. 3, the temperature control unit includes a temperature sensor 38 and a temperature control mechanism 6 that are included in the light projecting/receiving module 100, an LED temperature amplifier (amp) 52, a heater driver 53, and the control unit 50. The temperature control unit performs temperature control of the measuring LED 31 and temperature control of the reference LED 32 separately.

Figure 6:
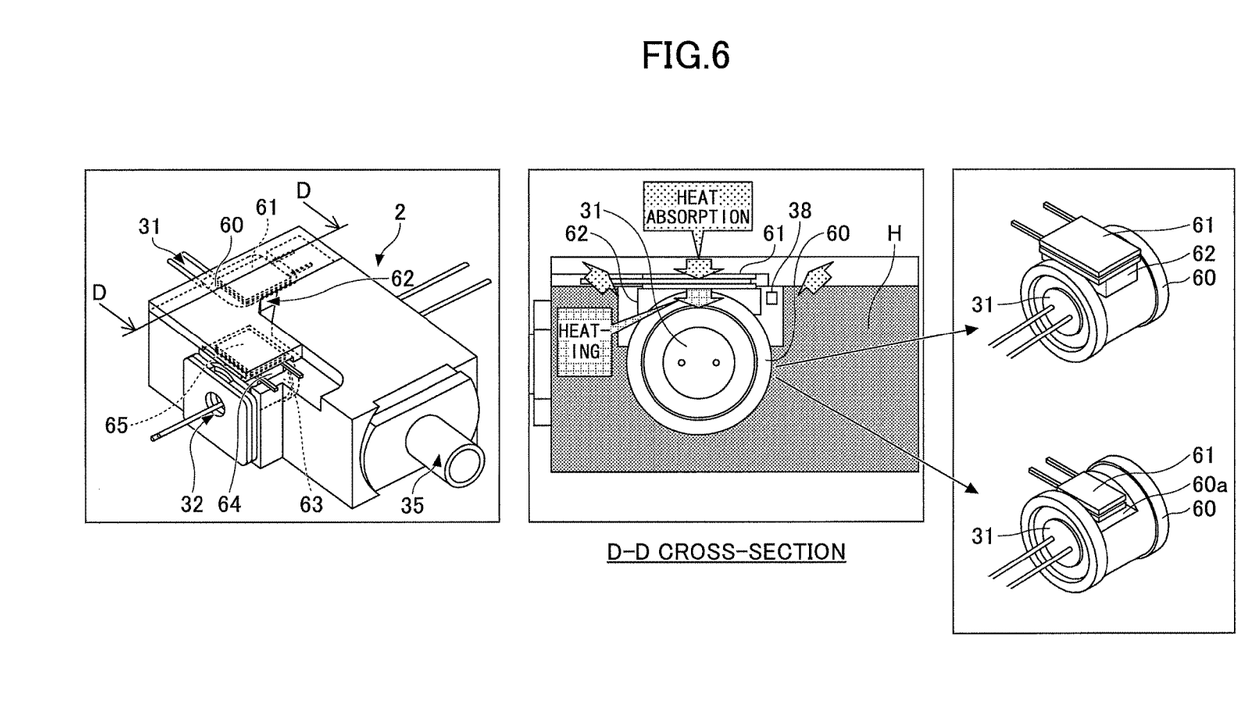
FIG. 6 is a diagram of a light projecting unit according to an embodiment of the present invention.

Referring to FIG. 6, as shown in the left diagram of FIG. 6, the measuring LED 31 and the reference LED 32 are arranged inside the light projecting unit 2. A separate temperature control function (temperature control unit) is provided for each of the measuring LED 31 and the reference LED 32. More specifically, the temperature control function may have a configuration as shown in the middle diagram of FIG. 6 corresponding to a cross-sectional view across line D-D of the left diagram of FIG. 6. As shown in the middle diagram of FIG. 6, the outer periphery of the measuring LED 31 is covered by a cylindrical member 60. Similarly, the outer periphery of the reference for LED 32 is covered by a cylindrical 63. The cylindrical members 60 and 63 may be made of aluminum, for example.

Aluminum plates 62 and 64 that are about 1 mm thick are respectively arranged above the cylindrical members 60 and 63, and Peltier elements 61 and 65 are respectively arranged on the aluminum plates 62 and 64. As shown in the middle diagram of FIG. 6, the Peltier element 61 (the following descriptions similarly apply to the Peltier element 65 such that overlapping descriptions are omitted) has the property of transporting heat from one metal to another metal when an electric current is applied to the junction of the two metals. In this way, heat absorption occurs at one side, and heat is generated at the other side. Note that the cylindrical member 60, the aluminum plate 62, and the Peltier element 61 constitute an example of a temperature control mechanism 6 of FIG. 3, and is also an example of a first temperature control mechanism for heating or cooling a first light source based on the temperature of the first light source. The cylindrical member 63, the aluminum plate 64, and the Peltier element 65 constitute another example of the temperature control mechanism 6 of FIG. 3 and is also an example of a second temperature control mechanism for heating or cooling a second light source based on the temperature of the second light source. Note that in some embodiments, the temperature control mechanism 6 does not have to include the aluminum plates 62 and 64.

For example, as shown in the middle diagram of FIG. 6, in a case where the current supplied to the Peltier element 61 is controlled based on the temperature detected by the temperature sensor 38 that is provided near the measuring LED 31, and a lower surface of the Peltier element 61 is controlled to give off heat as shown in the middle diagram of FIG. 6, the measuring LED 31 is heated via the aluminum plate 62 and the cylindrical member 60 having good thermal conductivity. In a case where the current supplied to the Peltier element 61 is controlled based on the temperature detected by the temperature sensor 38, and the lower surface of the Peltier element 61 is controlled to absorb heat, the measuring LED 31 is cooled via the aluminum plate 62 and the cylindrical member 60. The above descriptions similarly apply to the reference LED 32. That is, by controlling the current supplied to the Peltier element 65, the reference LED 32 may be heated and cooled in a similar manner.

In a conventional light projecting module, a high output heater is required to control the temperature of an overall housing. On the other hand, the temperature control unit of the present embodiment performs local temperature control for controlling the temperature of the measuring LED 31 and the temperature of the reference LED 32. Thus, temperature control may be performed on the measuring LED 31 and the reference LED 32 with a small amount of energy.

Further, in order to prevent heat at the cylindrical member 60 and 63 from escaping outside, the cylindrical members 60 and 63 are designed to be thermally isolated from a housing H that surrounds the outer peripheries of the cylindrical members 60 and 63. That is, spaces are provided around the cylindrical members 60 and 63 to reduce the areas of contact between the housing H and the cylindrical members 60 and 63. Note that in some embodiment, insulation rings (not shown) may be arranged between the housing H and the cylindrical members 60 and 63.

The Peltier element 61 may be placed on the aluminum plate 62 as shown in the upper right diagram of FIG. 6. Alternatively, a flat surface 60a may be formed at an upper portion of the cylindrical member 60 as shown in the lower right diagram of FIG. 6, and the Peltier element 61 may be placed on the flat surface 60a. Note that the Peltier element 65 may similarly be placed directly on the cylindrical member 63 rather than via the aluminum plate 64.

Returning to FIG. 3, a current value detected by the temperature sensor 38 is input to the LED temperature amplifier 52. The LED temperature amplifier 52 amplifies and converts the current value into a corresponding voltage value, and outputs the voltage value to the control unit 50. The control unit 50 outputs a control signal for controlling a current value to be output to a heater based on the input voltage value. The heater driver 53 supplies desired currents to the Peltier elements 61 and 65 of FIG. 6 based on the control signal. In this way, the temperatures of the measuring LED 31 and the reference LED 32 may be respectively controlled to desired temperatures. Also, temperature control of the measuring LED 31 and temperature control of the reference LED 32 are separately and independently performed.

Wavelength distributions of LEDs tend to vary depending on each individual LED. According to the present embodiment, a temperature control unit is provided for each of the measuring LED 31 and the reference LED 32, and temperature control is performed separately for each LED. In this way, individual unit differences and environmental temperature differences in the measuring LED 31 and the reference LED 32 may be absorbed.

[LED Aging]

The light quantity of an LED changes over time and gradually decreases. Therefore, by monitoring the light quantity actually output by the LED and controlling the light quantity output by the LED to be constant, a temperature may be more accurately measured. Accordingly, in the temperature measuring apparatus 30 according to the present embodiment, the LED SiPD 34 as shown in FIGS. 3 and 4 is provided in order to monitor the light quantities output by the LEDs.

The LED SiPD 34 is a photodiode for light projection confirmation and outputs a current value corresponding to the light quantity of the measuring light output by the measuring LED 31. The LED monitoring PD amplifier 43 amplifies and converts the current value output by the LED SiPD 34 into a corresponding voltage value and outputs the voltage value to the control unit 50.

The control unit 50 measures the light quantity output by the LED SiPD 34 based on the input voltage value, and controls a current to be supplied to the measuring LED 31 to increase in accordance with a decrease in the measured light quantity.

The measuring light LED driver 40 performs feedback control of the current to be supplied to the measuring LED 31 according to the pulse width of a control signal output by the control unit 50.

Similarly, the LED SiPD 34 outputs a current value corresponding to the light quantity of the reference light output by the reference LED 32. The LED monitoring PD amplifier 43 amplifies and converts the current value output by the LED SiPD 34 into a corresponding voltage value and outputs the voltage value to the control unit 50.

The control unit 50 measures the light quantity output by the LED SiPD 34 based on the input voltage value input, and controls a current to be supplied to the reference LED 32 to increase in accordance with a decrease in the measured light quantity.

The LED driver 41 performs feedback control of the current to be supplied to the reference LED 32 based on the pulse width of a control signal output by the control unit 50.

With the above configuration, the light quantity output by the measuring LED 31 and the light quantity output by the reference LED 32 may be monitored in order to control the light quantities output by the LEDs to be constant with respect to the aging of the LEDs.

Note that the LED SiPD 34 corresponds to an example of a monitoring unit for monitoring the light quantities of the measuring light and the reference light. The measuring LED 31 corresponds to an example of a first light source for outputting measuring light of a first wavelength. The reference LED 32 corresponds to an example of a second light source for outputting reference light of a second wavelength.

Example Advantages

Figure 7:
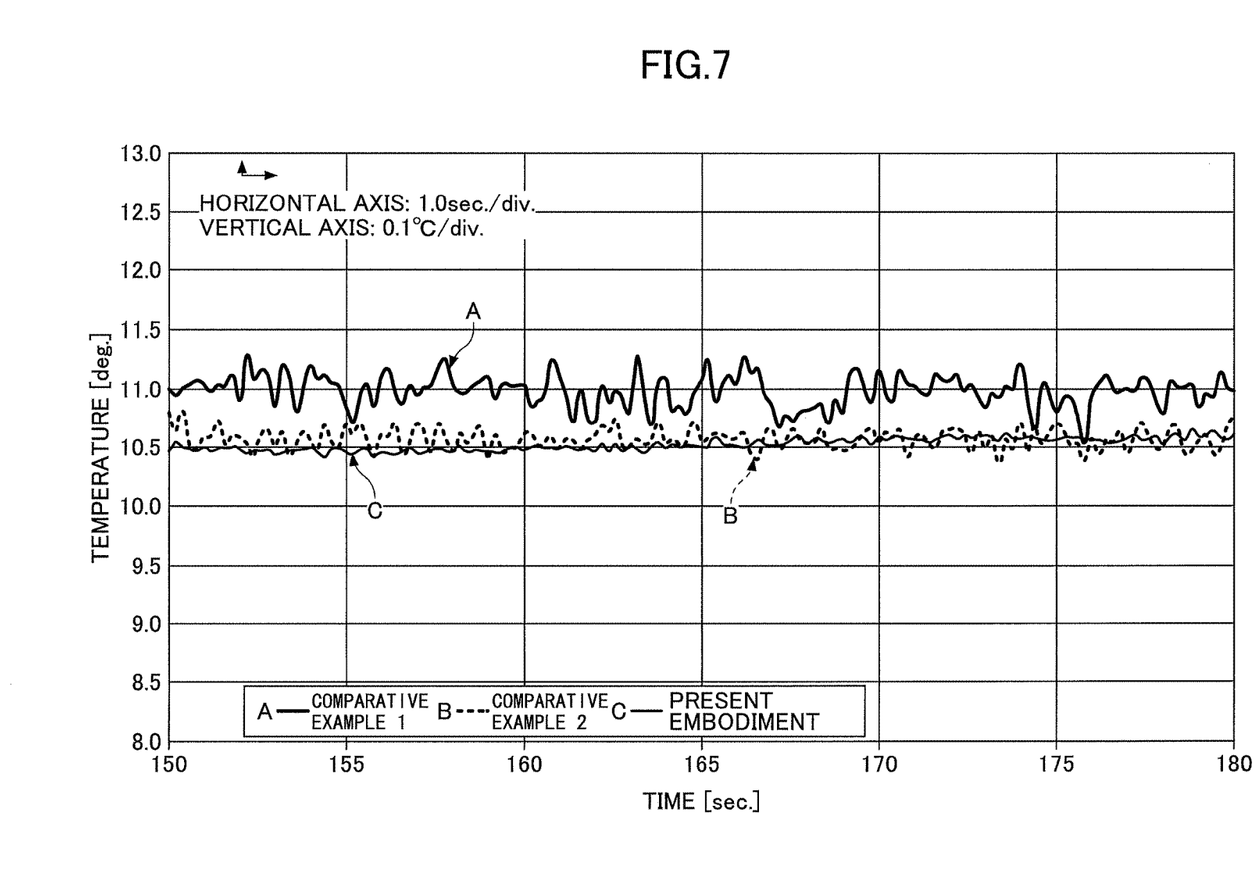
FIG. 7 shows example temperature measurement results according to an embodiment of the present invention (stability)
Figure 8:
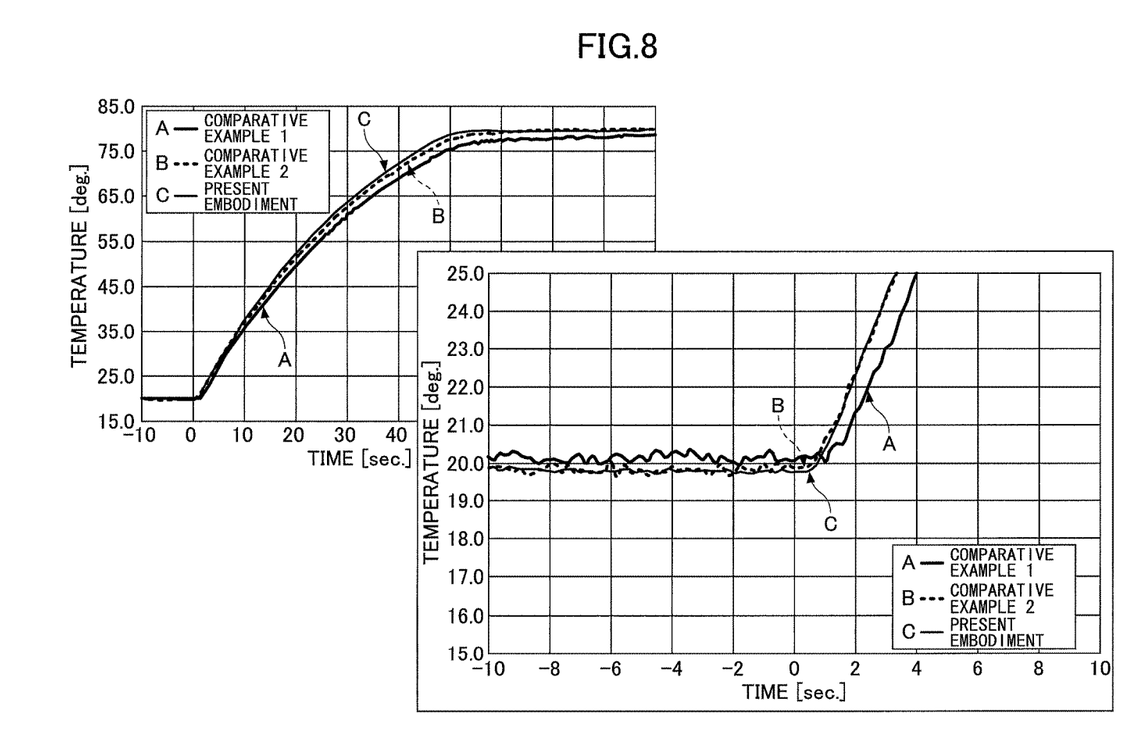
FIG. 8 shows other example temperature measurement results according to an embodiment of the present invention (responsiveness)
Figure 9:
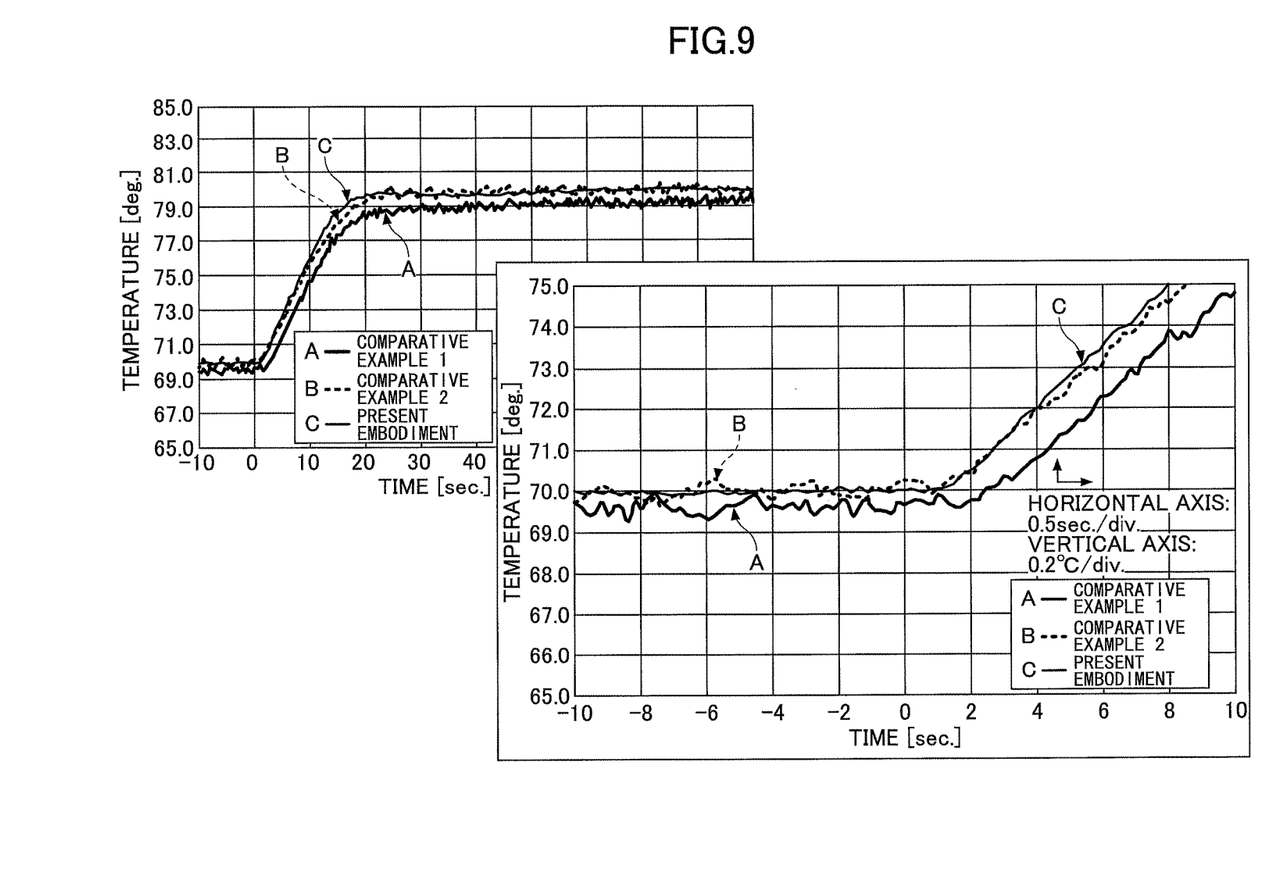
FIG. 9 shows other example temperature measurement results according to an embodiment of the present invention (responsiveness).

FIGS. 7-9 show example temperature measurement results according to the present embodiment. Note that in the graphs shown in FIGS. 7-9, the horizontal axis represents the time (seconds), and the vertical axis represents the surface temperature (° C.) of a temperature measuring object. FIG. 7 shows detection values detected by temperature sensors of the present embodiment and Comparative Examples 1 and 2 over the course of time indicated by the horizontal axis in a case where the surface temperature of the temperature measuring object was not changed.

According to FIG. 7, in comparing the temperatures detected by the temperature sensors of the present embodiment and Comparative Examples 1 and 2, it can be appreciated that the temperatures detected by the optical temperature sensor 1 according to the present embodiment have the least amount of variations. The temperatures detected by the temperature sensor of Comparative Example 1 has variations about three times as large as the temperature variations of the optical temperature sensor 1 according to the present embodiment, and the temperatures detected by the temperature sensor of Comparative Example 2 has variations about twice as large as the temperature variations of the optical temperature sensor 1 according to the present embodiment. As can be appreciated from the above, favorable output characteristics and stability can be achieved in the optical temperature sensor 1 of the present embodiment.

Further, FIG. 8 shows detection values detected by the temperature sensors of the present embodiment and Comparative Examples 1 and 2 over the course of time indicated by the horizontal axis in a case where the surface temperature of the temperature measuring object was controlled to change from 20° C. to 70° C. According to FIG. 8, in comparing the temperatures detected by the optical temperature sensor 1 of the present embodiment and the temperature sensors of Comparative Examples 1 and 2, it can be appreciated that the optical temperature sensor 1 of the present embodiment has higher responsiveness as compared with the temperature sensor of Comparative Example 1. Further, referring to the diagram on the right of FIG. 8 showing an enlarged view of the detection values of the temperature sensors around the temperature rise time, it can be appreciated that the detection values of the optical temperature sensor 1 of the present embodiment have smaller variations as compared with the detection values of the temperature sensor of Comparative Example 2. As can be appreciated from the above, favorable output characteristics, stability, and responsiveness can be achieved in the optical temperature sensor 1 of the present embodiment.

Further, FIG. 9 shows detection values detected by the temperature sensors of the present embodiment and Comparative Examples 1 and 2 over the course of time indicated by the horizontal axis in a case where the surface temperature of the temperature measuring object was controlled to change from 70° C. to 80° C. According to FIG. 9, in comparing the temperatures detected by the optical temperature sensor 1 of the present embodiment and the temperature sensors of Comparative Examples 1 and 2, it can be appreciated that the optical temperature sensor 1 of the present embodiment higher responsiveness as compared with the temperature sensor of Comparative Example 1. Also, referring to the diagram on the right of FIG. 9 showing an enlarged view of the detection values of the temperature sensors at the temperature rise time, it can be appreciated that the optical temperature sensor 1 of the present embodiment has smaller variations as compared with the detection values of the temperature sensor of Comparative Example 2. As can be appreciated from the above, the optical temperature sensor 1 of this embodiment, favorable output characteristics, stability, and responsiveness can be achieved in the optical temperature sensor 1 of the present embodiment even in cases where temperature fluctuations occur in a relatively high temperature region.

As described above, according to the present embodiment, the tip face of the optical fiber and the thermosensitive element are arranged to face each other while being separated from each other by a predetermined distance. In this way, an optical temperature sensor with desirable accuracy, responsiveness, and stability may be provided. Further, according to the present embodiment, a method for manufacturing a low-cost optical temperature sensor that can achieve a predetermined level of performance may be provided.

Further, according to the temperature measuring device 30 of the present embodiment, temperature measurement may be performed in a short period of time. Further, according to the temperature measuring device 30 of the present embodiment, the light quantities of the measuring light and the reference light output by the measuring LED 31 and the reference LED 32 may be controlled to be constant. In this way, changes in the temperature measuring device 30 caused by aging may be suppressed, highly accurate temperature measurement may be enabled, and the service life of the temperature measuring device 30 may be prolonged.

Further, according to the temperature measuring device 30 of the present embodiment, a temperature control unit is provided for each of the measuring LED 31 and the reference LED 32, and temperature control is separately performed for each of the LEDs. In this way, individual unit differences and environmental temperature differences in the measuring LED 31 and the reference LED 32 may be absorbed.

A method for manufacturing an optical temperature sensor and an optical temperature sensor according to the present invention have been described above with respect to illustrative embodiments. Also, a temperature measuring device, a light projecting module, and a temperature measuring method according to the present invention have been described above with respect to illustrative embodiments. However, the present invention is not limited to the above-described embodiments, and various changes and modifications may be made within the scope of the present invention. Also embodiments of the present invention and modifications thereof may be combined to the extent practicable.

For example, an optical temperature sensor, a temperature measuring device, and a temperature measuring method according to the present invention may be applied to temperature measurement of an electrostatic chuck or some other component part of an etching apparatus, an ashing apparatus, or a thin film deposition apparatus.

The present application is based on and claims the benefit of priority of Japanese Patent Application No. 2014-042137 filed on Mar. 4, 2014, the entire contents of which are herein incorporated by reference.

DESCRIPTION OF THE REFERENCE NUMERALS

1: optical temperature sensor
2: light projecting unit
3: light receiving unit
6: temperature control mechanism
10: thermosensitive element
11: heat transfer aluminum plate
12: holding cylinder
12a: cutout portion
12b: protruding portion
13: optical fiber
14: fixing member
14a: drop shoulder portion
15: spring
30: temperature measuring device
31: measuring LED
32: reference LED
33: beam splitter
34: LED SiPD
35: optical connector
36: measuring SiPD
37: optical connector
38: temperature sensor
40: measuring LED driver
41: reference LED driver
42: measuring PD amplifier
43: LED monitoring PD amplifier
44: 16-bit A/D converter
50: control unit
52: LED temperature amplifier
53: heater driver
60, 63: cylindrical member
61, 65: Peltier element
62, 64: aluminum plate
100: light projecting/receiving module

The invention claimed is:

1. An optical temperature sensor comprising:
a temperature sensing element having light transmission characteristics that vary with temperature;
a hollow holding member that holds the temperature sensing element;
an optical fiber that is arranged inside the holding member, the optical fiber including a tip face that is disposed to face the temperature sensing element at a position separated from the temperature sensing element by a predetermined distance, and
a fixing member having a low thermal conductivity and provided at a tip portion of the optical fiber for fixing the optical fiber to the holding member;
wherein the fixing member includes a drop shoulder portion formed near the tip face of the optical fiber, the drop shoulder portion being separated from the holding member;
wherein the temperature sensing element allows light emitted from the tip face of the optical fiber to be incident thereon, allows the incident light to be transmitted therethrough, and allows reflected light of the transmitted light that has been reflected by a measuring object to be transmitted therethrough.

2. The optical temperature sensor according to claim 1, wherein
the holding member includes a cutout portion arranged at a position near the temperature sensing element so as to introduce outside air into the holding member from the cutout portion.

3. The optical temperature sensor according to claim 1, wherein
the holding member includes a protruding portion; and
a spring is arranged in the protruding portion.

4. The optical temperature sensor according to claim 1, wherein
the optical temperature sensor is a semiconductor absorption wavelength-based temperature sensor that detects a temperature using the temperature sensitive element that changes an absorption wavelength for transmitted light as a function of temperature.

5. A method for manufacturing the optical temperature sensor according to claim 1, the method comprising:
a step of holding the temperature sensing element in the holding member;
a step of rotating the holding member in a state where the tip face of the optical fiber is separated from the temperature sensitive element, and optimizing a facing position of the tip face of the optical fiber with respect to the temperature sensing element; and
a step of arranging the optical fiber at the optimized facing position, which is separated from the temperature sensing element by the predetermined distance.

6. The optical temperature sensor according to claim 1, wherein the fixing member is made of polyphenylene sulfide.

7. The optical temperature sensor according to claim 1, wherein the hollow holding is a unified body.

* * * * *